United States Patent [19]

Richard et al.

[11] Patent Number: 4,841,304

[45] Date of Patent: Jun. 20, 1989

[54] INSTALLATION FOR THE DETECTION AND LOCATION BY INTERFEROMETRY, IN REAL TIME AND AT GREAT DISTANCE OF LIGHTENING STRIKES

[75] Inventors: Philippe Richard; André Soulage, both of Paris; Jean Appel, Vanves, all of France

[73] Assignee: Office National d'Etudes et de Recherches Aerospatiales (ONERA), Chatillon S/Bagneux, France

[21] Appl. No.: 277,434

[22] Filed: Nov. 28, 1988

Related U.S. Application Data

[63] Continuation of Ser. No. 71,311, Jul. 9, 1987, abandoned.

[30] Foreign Application Priority Data

Jul. 10, 1986 [FR] France ................ 86 10091

[51] Int. Cl.$^4$ .............................. G01J 3/02
[52] U.S. Cl. ................. 342/460; 342/156; 324/72
[58] Field of Search ............. 342/26, 156, 169, 170, 342/424, 460, 465; 324/77 R, 72; 73/170 R

[56] References Cited

U.S. PATENT DOCUMENTS

| | | | |
|---|---|---|---|
| 3,229,289 | 1/1966 | Stine | 342/170 |
| 3,670,332 | 6/1972 | Blommerdaal | 342/156 X |
| 3,754,263 | 8/1973 | Wojtasinski et al. | 342/460 |
| 3,886,554 | 5/1975 | Braun et al. | 342/465 |
| 4,115,732 | 9/1978 | Krider et al. | 324/72 |
| 4,215,345 | 7/1980 | MacDoran | 342/156 |
| 4,543,580 | 9/1985 | Bent et al. | 342/460 |
| 4,594,543 | 6/1986 | Eriksson et al. | 324/72 |
| 4,801,942 | 1/1989 | Markson et al. | 342/460 |

FOREIGN PATENT DOCUMENTS

| | | | |
|---|---|---|---|
| 0836611 | 6/1981 | U.S.S.R. | 342/460 |
| 2160735 | 12/1985 | United Kingdom | 342/460 |

*Primary Examiner*—Thomas H. Tarcza
*Assistant Examiner*—Tod Swann
*Attorney, Agent, or Firm*—Larson and Taylor

[57] ABSTRACT

The installation comprises a certain number of measuring stations, represented here as three in number referenced respectively 1, 2 and 3, equipped respectively with antennae $I_1$, $I_2$, $I_3$, which are connected by transmission lines $L_1$, $L_2$ and $L_3$ to a central data acquisition unit 4, itself connected to a real time data processing unit 5. The central unit 4 comprises receiving means, means for sorting and associating the data and means for momentary storage of the sorted and associated data.

12 Claims, 9 Drawing Sheets

INSTALLATION FOR THE DETECTION AND LOCATION BY INTERFEROMETRY, IN REAL TIME AND AT GREAT DISTANCE OF LIGHTENING STRIKES

This application is a continuation of application Ser. No. 071,311 filed July 9, 1987 now abandoned.

BACKGROUND OF THE INVENTION

The present invention relates to the field of detection and location by interferometry, in real time and at a great distance, of lightening strikes, and more particularly it relates to an installation, for such detection and location, which comprises at least two angular locating stations for the strikes, situated at a moderate distance from one another, each station comprising:

at least two fixed receiving antennae for at least one electromagnetic radiation of predetermined wavelength generated by the lightening strikes, and interferometric processing means for the signals delivered by the antennae, arranged to provide data representative of the elevation and/or azimuth of the source of electromagnetic radiation constituted by the lightening strike.

The known principle of angular location of VHF-UHF sources by interferometry consists of measuring the phase separation $\Delta\phi$ between the signals arriving simultaneously at two antennae. It is then possible to find by calculation the angle of incidence $\alpha$ of the electromagnetic wave with respect to the axis passing through the two antennae by means of the relationship:

$$\Delta\phi = 2\pi\, D/\lambda\, \sin\alpha$$

where $D/\lambda$ is the distance between antennae expressed in wavelengths.

A measurement of this type enables location of the source in a cone centered on the axis passing through the two antennae and the vertex angel $\alpha$. A second interferometric base, that is to say a third antenna (since the same antenna is used as a phase reference), enables the direction of origin of the source to be found, in bearing and in elevation. From the azimuth and elevation data obtained at the two locating stations it is then possible, by calculation of elapsed time, to determine, by triangulation, the position in space of the source.

A known installation for the location in space of lightening strikes comprises two angular locating stations for the strikes, each of the stations comprising two sets of three antennae. The first set is constituted by three antennae separated mutually by a relatively great distance (for example 10 m for an operational frequency of 300 MHZ); it permits precise location of a source but with a large number of ambiguities since the phase measurement is made to the nearest $2\pi$). The second set is constituted by three antennae separated by a relatively short distance (for example 0.5 m) and enables the ambiguities of location of the first system to be removed.

Contrary to all other methods of location which use measurements on the amplitude of the signal (measurements of difference in arrival time, measurements of goniometric type), interferometric location becomes independent of the wave-forms of the lightening signals, by measurements depending only on the phase of the signal. This permits measurements over large energy ranges (typically 80 dB), which is fully adapted to the considerable variations of signal level due to the emission power of the sources, as well as to the considerable extent of the field of surveillance.

However, constructed purely for purposes of study and research on the phenomenology of lightening, this known installation possesses characteristics which do not make it suitable for operational surveillance use enabling the protection of a site to be ensured. In particular, its high resolution in time and in space are superfluous for a surveillance installation; its range is insufficient; its cost is excessive; and especially the processing of the data in elapsed time is incompatable with a surveillance function.

In addition, there is also known, according to Patent Application EP-A-0161940, an installation for the processing of data arranged around a digital computer which determines, by triangulation, the coordinates of the point of impact of a flash with the ground from its angular positions, in azimuth, provided by goniometric locating stations. However, the measurement method used, based on amplitude measurements, and the means employed in each of the stations do not permit the location in space of all the electromagnetic sources associated with a lightening strike. In particular, the locating stations described in this document comprise receiving antennae of the "loop antennae" type which only operate correctly when the magnetic component of the wave to be detected is vertically polarized, which occurs essentially at the striking point of the flash with the ground.

GENERAL DESCRIPTION OF THE INVENTION

It is therefore an essential object of the invention to provide an installation for the detection and location in space, in real time and at a great distance of lightening strikes enabling an operational function of surveillance to be ensured with minimum technical construction and maintenance.

To this end, there is provided according to the invention an installation characterized in that each station comprises in addition:

threshold validating means sensitive to at least one magnitude of the electromagnetic radiation received (particularly its density of emission and/or its amplitude), arranged to deliver an actuating signal if said magnitude is greater than a pre-established threshold, data-sorting means placed under the dependance of said threshold validating means, to select the angular data provided by the interferometric processing means, only when said magnitude is greater than its pre-established value, digital data forming and processing means arranged so that each of these data is constituted by information representative of the elevation and/or azimuth, selected by the sorting means and by information representing the date of the lightening strike, momentary storage means for the numerical data thus constituted, these storage means retaining said numerical data for a time which is a function of the transmission flow rate possible, and transmission means, in a transmission line, of the numerical data; said installation being in addition characterized in that it comprises:

transmission lines connecting respectively said locating stations with a center for the acquisition of the numerical data; this acquisition center for the numerical data comprising:

respective receiving means for the numerical data coming from the locating stations, means for sorting and associating the information having in a certain time zone the same date and coming respectively from different locating stations, and momentary storage means for the sorted and associated information, the storage means retaining this information for a time which is a function of the calculating capacity:

calculating means arranged to determine by triangulation, from the sorted and associated data on elevation and/or azimuth, the spacial position of the lightening strike which occurred at said date;

and display means for the results provided by the calculating means.

In order that the installation may preserve its efficiency whatever the position of the lightening strike with respect to the angular locating stations, it is advantageous for the installation to comprise at least three not mutually aligned locating stations, that it comprises in addition means for determining the two stations adapted to provide, at a given date, the spacial position with the best precision, and that the sorting means of the acquisition center of the numerical data be arranged to select pairs of information of the same date collected by the two stations procuring the best precision at this date.

To increase the accuracy of the measurements carried out, it is preferable for the locating stations to possess respectively time bases synchronized from a common synchronization source and means for taking into account respective delays undergone by the synchronizing signals in the respective transmission lines.

In this case, it is possible to provide the following arrangements:

the common synchronization source comprises synchronization signal generators of substantially square form, having a frequency of about 1 Hz, with a cyclic ratio substantially equal to 1 and modulated in frequency, and memorization means which contain values corresponding to an elementary period of the modulation frequency and which are addressed by a clock signal constituted by said synchronization signal, connecting means are provided between said common synchronization source and the respective time bases of the locating stations to transmit to said time bases the output signals of the memorization means, and each time base of a locating station comprises filtering and shaping means for the signal received, means for the determination of the moments of frequency change of said received signal, selection means to select in this signal a stable synchronization signal, delay means, coupled with the above-mentioned means for taking into account the delay introduced by the time of transmission in the above-said connecting means with respect to the time of transmission in the connecting means with the other locating stations, and output means of a signal, stable and compensated, of time base synchronization.

In a particular embodiment, the threshold validating means are sensitive particularly to the emission density and comprise:

counting means arranged to count for a predetermined period T from their starting, detection means for the presence, at the receiving antennae, of an electromagnetic radiation to be detected, triggering means, actuated by the above-said detection means, to trigger the starting said counting means, comparator means to compare the output signal of the counting means at the end of a time T with a predetermined threshold, and memorizing means for the result of this comparison showing a first voltage level if the counting is less than the predetermined threshold or a second voltage level if the counting is higher than said threshold.

In the case where it is desired to carry out an omnidirectional detection, it is possible to arrange so that each locating station comprises three simple antennae omnidirectional in bearing, these antennae being arranged in a triangle and being selected form among the types monopolar $\lambda/4$ on a plane, monopolar $5\lambda/8$ in a plane or dipolar $\lambda/2$ ($\lambda$ being the wavelength of the electromagnetic radiation to be detected). In this case, to avoid problems of coupling between antennae, it is desirable for the antennae to have a relatively low directivity in elevation, particularly less than or equal to 3 dB.

On the other hand, in the case where it is desired to carry out directional detection, it is possible to arrange that each locating station comprises directional antennae in bearing, particularly arranged for detection in a limited angular field or arranged for isotropic detection in bearing by combination of several antennae pointed in complementary directions.

Advantageously, the antennae of each station are mutually spaced by about one-half wavelength of the radiation to be detected.

It is possible, in addition, to provide that the installation according to the invention should comprise means for determining the time differences of arrival at the numerical data acquisition center of the numerical data coming from different locating stations and so that the calculating means are arranged to use this arrival time difference information conjointly with the other sorted and associated data on elevation and/or bearing, so that it is possible to locate the source of electromagnetic radiation constituted by the lightening strike from an ambiguous antennae system, but conferring better angular resolution.

Still for the purpose of eliminating to the maximum the causes of error or of uncertainty and increasing the accuracy of the measurements, it is possible to provide for the installation to include in addition standardization means including an emitter of electromagnetic radiation of the frequency to be detected and means for the detection and calculation of the phase difference itself of the installation, by means of which it is possible to correct the measurements therefrom.

The invention will be better understood on reading the detailed description which follows of a preferred embodiment given purely by way of non-limiting example.

BRIEF DESCRIPTION OF THE DRAWINGS

In this description reference is made to the accompanying drawings in which.

DESCRIPTION OF PREFERRED EMBODIMENTS

Figure 1:
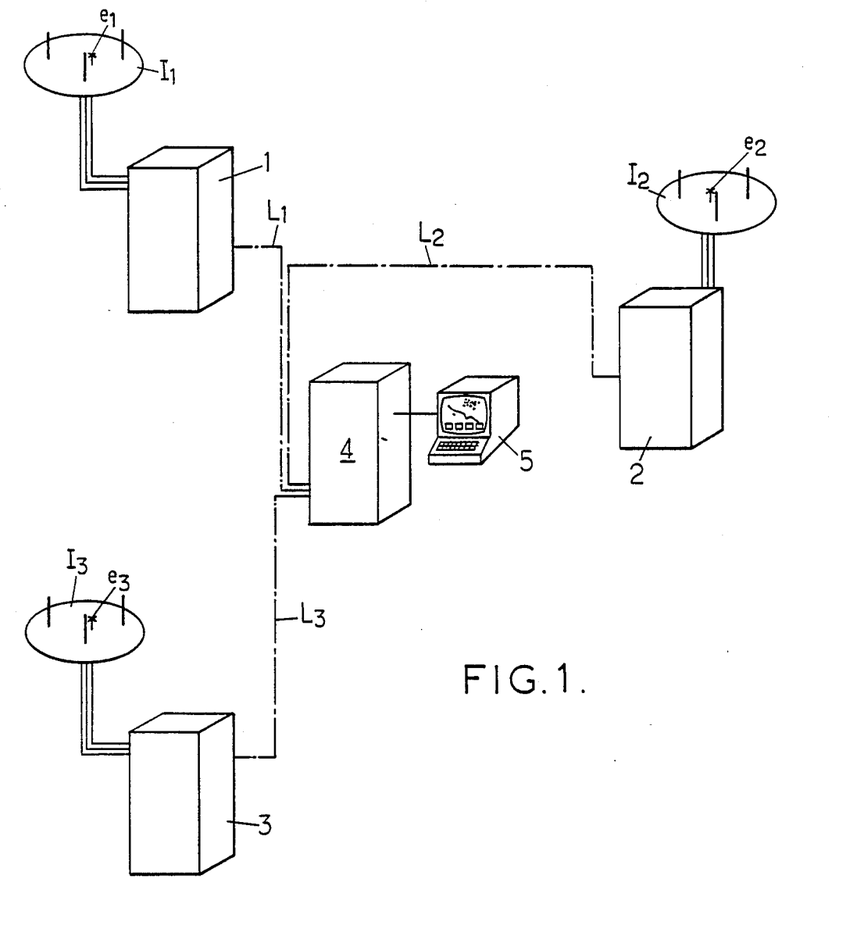
FIG. 1 is a very diagrammatic view of the whole of an installation according to the invention.

The installation for the detection and location in space by interferometry, in real time and at a great distance of lightening strikes is shown, as a whole and very diagrammatically, in FIG. 1.

The installation comprises a certain number of measuring stations, represented here as three in number referenced respectively 1, 2 and 3, equipped respectively with antennae $I_1$, $I_2$, $I_3$, which are connected by transmission lines $L_1$, $L_2$ and $L_3$ to a central data acquisition unit for data 4, itself connected to a processing unit for data in real time 5.

The location of the storm activity being done by triangulation, the geometry of placing of measuring stations has to be optimized according to the extent of the field of observation, as well as the availability of sites.

It is hence directly tributary of the performance of each station and in particular of the distance of detection; the latter depends on the level of the VHF-UHF radiation sources associated with the lightening, the altitude of these sources (typically from 0 to 10 km) as well as the altitude of each receiving station. For typical situations, it is possible to estimate this distance of detection at 150 km to 200 km.

Two cases of principal situations can be envisaged for the placing of the stations:

1—The measuring stations are within the field of observation. In this case, each station has an angular field of observation of 360° and uses three measuring antennae mutually separated by a distance corresponding to a half wavelength. The distance between stations, which can typically be from 20 to 80 km, is optimized according to criteria of accuracy of location in the field studied, range and situation. A minimum of two stations is necessary, but three stations are preferable in order to avoid the angular zones for which the error of location by triangulation is large (axis of each pair of stations).

2 The measuring stations are outside the field of observation. In this case, each station has an angular field of observation less than 180°, with a very low elevation; it is then possible to use only two antennae, preferably directional, for each station. The distance between the antennae can then be selected as greater than a half wavelength in order to improve the accuracy of location within the field angle adopted.

The distance between stations will be comparable to the dimensions of the field of observation (typically 100 to 200 km).

Two stations are sufficient when the field of observation is outside the axis of the station; three are preferable when the field covers areas situated between the stations.

The operating frequency of the receiver can be selected within the range VHF-UHF, for example in the vicinity of 140 MHz (hence a half wavelength is of the order of 1 meter).

This frequency field enables access to sources of radiation present in all the phases of the lightening strike, and hence permits the location of all the phenomena of atmospheric discharges as precursor mechanisms of lightening strikes to the ground, the return wave of the cloud-ground arc, or the intra-cloud mechanisms.

The fact, in particular, of detecting intra-cloud discharges is important since the latter represents 80 to 90% of the electrical activity of a storm cloud; this also presents an advantage as regards the protection of aircraft or of rockets in flight.

Figure 2:
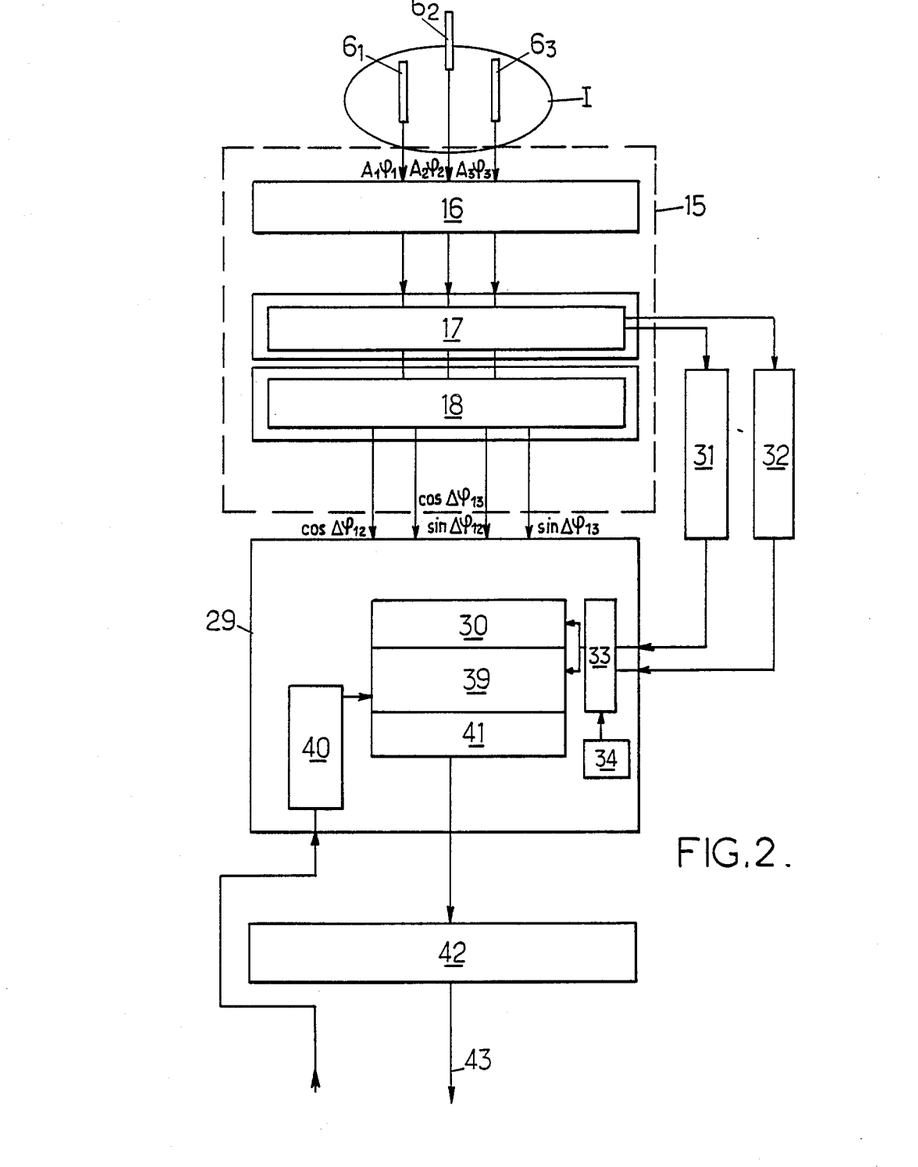
FIG. 2 is a block diagram of a measuring station forming part of the installation of FIG. 1, FIGS. 3 to 5 are diagrammatic views of different antennae systems usable in the measuring station of FIG. 2.
Figure 3:
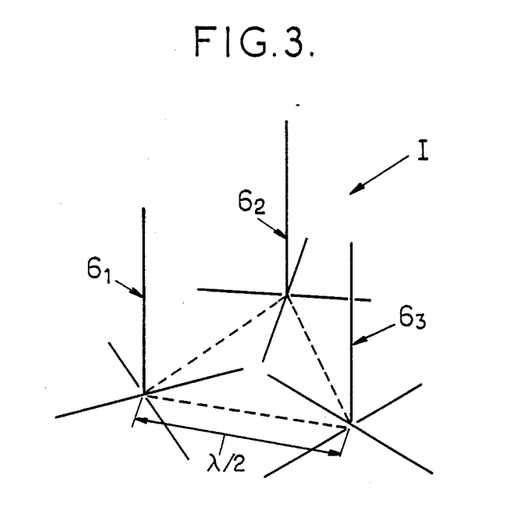

The general arrangement of a measuring station is shown in FIG. 2. This station is equipped with an antennae system I for which two configurations are more particularly to be taken into consideration:

1. a first antennae system (see FIG. 3) is constituted by three simple antennae $6_1$ to $6_3$, omnidirectional in bearing, arranged at the apices of an equilateral triangle whose sides have a length of about $\lambda/2$; in this case the antennae may be of the monopole $\lambda/4$ on a plane type, monopole $5\lambda/8$ on a plane, or dipole $\lambda/2$, having a slight directivity in elevation ($\leq 3$ dB). This is the type of antenna which is shown diagrammatically at I in FIG. 2. If an increased directivity in elevation is desired, the use may be envisaged of antennae of the colinear isotropic in azimuth dipole type, but directional in elevation (6 to 8 dB) although in this case the problems of coupling between antennae are more difficult to master.

Figure 4:
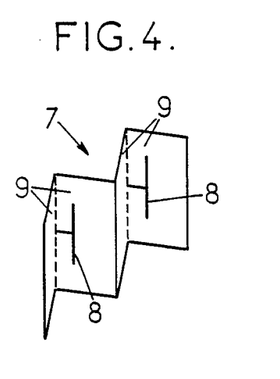
Figure 5:
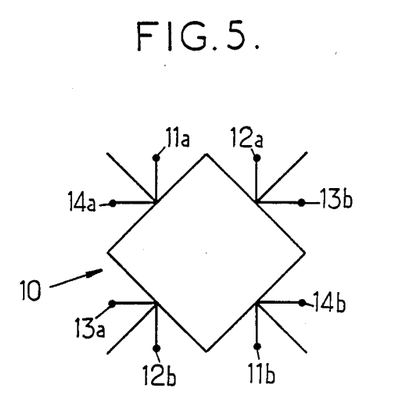

2. a second antennae system is constituted by antennae directional in azimuth. Such a system 7 (shown in FIG. 4) may for example be of the $\lambda/2$ dipole type, 8, with a dihedral reflector 9 constituted by flat metal sheets, which is suitable for showing a gain of about 10 dB and which is suitable for observations within a limited angular field. It is also possible, if isotropy in azimuth is desired, to resort to a complex antenna 10 (shown in view from above in FIG. 5) combining several directional antennae pairs (11a, 11b; 12a, 12b; 13a, 13b; 14a, 14b) pointed in complementary directions; in the latter case the signals coming from two complementary antennae are combined with one another (which comes back to reconstituting an omnidirectional antenna with several directional antennae): the antennae 11a and 11b provide a first signal and the antennae 12a and 12b supply a second signal, these first and second signals constituting a first pair of signals for a first channel, whilst the antennae 13a and 13b provide a third signal and the antennae 14a and 14b provide a fourth signal, these third and fourth signals constituting a second pair of signals for a second channel; thus two independant interferometric pairs are obtained.

Coming back to the general diagram of a measuring station shown in FIG. 2, the three antennae $6_1$ to $5_3$ provide respectively three pairs of magnitudes, respectively the amplitude $A_1$, $A_2$ and $A_3$ and the phase $\phi_1, \phi_2,$ and $\phi_3$, of the electromagnetic radiation detected.

The output signals of three antennae are sent into an interferometric processing unit 15, comprising means of filtering, amplification and frequency change (at 16), then VHF receiving means (at 17), and finally analogic phase processing means (at 18) providing the cosine ($\cos\Delta\phi 1_2$) and the sine ($\sin\Delta\phi 1_2$) of the phase difference angle between the signals received through the antennae $6_1$ and $6_2$ and the cosine ($\cos\Delta\phi 1_3$) and the sine ($\sin\Delta\phi 1_3$) of the phase difference angle between the signals received through the antennae $6_1$ and $6_3$.

Figure 6:
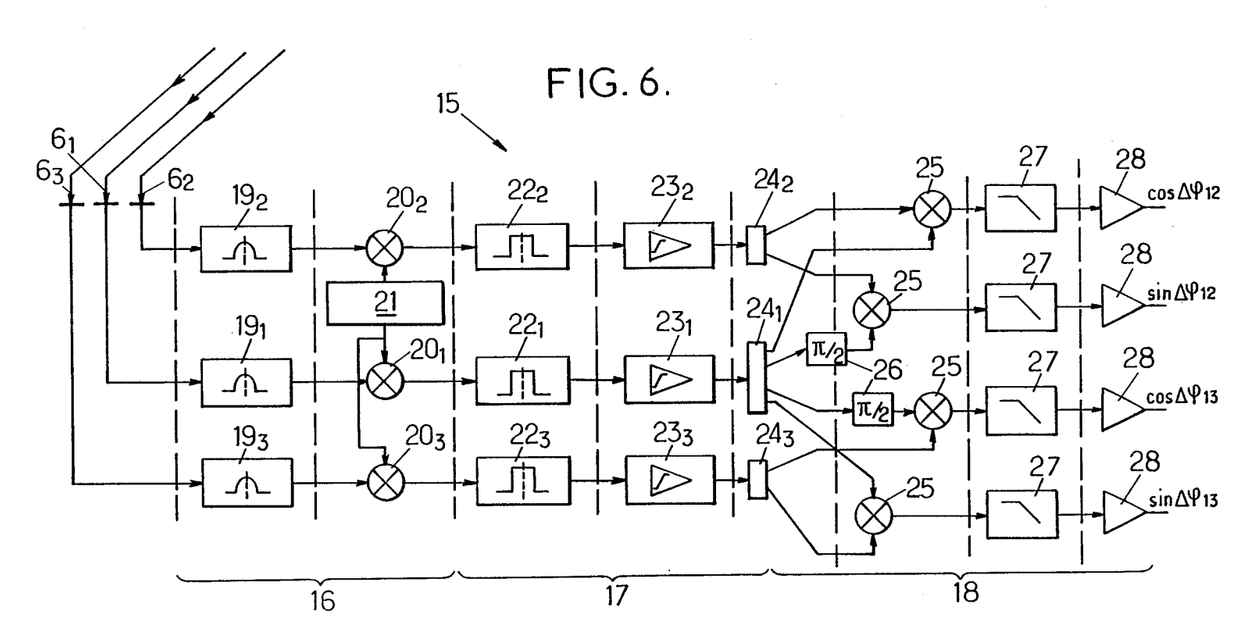
FIG. 6 is a functional block diagram of one embodiment of a part of the measuring station of FIG. 2.

Such an interferometric processing unit 15 is already known. To fix ideas, one example of construction is shown in FIG. 6. The three antennae $6_1$ to $6_3$, of the type monopole $\lambda/4$ on a plane, are joined respectively to three filters 19 paired in phase having typically a band pass of 10 MHz centered on a frequency of 140 MHz. These filters 19 are respectively connected to three frequency change dividers 20 connected also to a frequency generator 21 of 170 MHz typically. The frequency change dividers 20 are connected respectively to three intermediate frequency filters 22 paired in phase and having typically a band pass of 1 MHz centered on the frequency of 30 MHz. These filters are connected to three limiting amplifiers 23 having typically a power range of 80 dB, which are themselves connected to three distributors 24. The latter are connected to four mixers 25 either directly for the two mixers of the cosine channels, or through a $\pi/2$ phase shift 26 (for one of their inputs) for the two mixers of the sine channels. The mixers are finally connected respectively to four low-frequency filters 27, having a typical band pass of about 0–5 kHz, themselves connected respectively to four output amplifiers 28.

Of course, an equivalent two-channel circuit is to be used in the case where the station is equipped with a detection system with only two antennae.

Coming back to FIG. 2, the signals supplied by the interferometric processing unit 15 are then processed numerically, in a digital processing unit 29.

The digital processing unit 29 comprises first of all a numerizing and processing circuit 30 which ensures respectively the analog/digital conversion of the data $\cos\Delta\phi 1_2$, $\sin\Delta\phi 1_2$, $\cos\Delta\phi 1_3$ and $\sin\Delta\phi 1_3$ and the calculation of the angular direction in elevation and/or azimuth of the source of radiation with respect to the station.

However, all the data are not systematically taken into account and sorting of the data is simultaneously done by validation of the data provided by the numerizing and processing circuit 30. Selection is made on the base of detection of the amplitude of the signal (circuit 31) and/or of detection of its density of emission (circuit 32) which are compared (validation circuit 33) to respective programmable thresholds (threshold circuit 34).

The selection in amplitude enables an acquisition threshold to be given and hence a quality of measurement to be defined (by indirect selection of the minimum signal to noise ratio). It can also be considered as a means of limiting the range.

The selection of density of emission, on the other hand, bears directly on the mechanisms of emission associated with the atmospheric discharges. It is possible to define this emission density in the time resolution window of the measurement as the percentage of time during which the radiation is present (for example number of microseconds of emission in the analysis window of 100 μs).

This method of selection associated with a measurement finely resolved in time (100 μs) enables access to the spacial extension of the discharges. Lightening discharges have in fact, in the course of the process, intense emissions during several hundreds of microseconds and extending over distances which can exceed some ten kilometers. The possibility of sampling these discharges at several points (one for each hundred μs), associated with the knowledge of the emission density enables a reconstitution of the path of the discharge and hence leads to knowledge of the extention of the regions subject to lightening.

The great time resolution of the measurement also enables the probability of occurence to be limited, within the same time window, of spacially distinct discharges.

Finally, the criterion of selection on the density of emission can permit the elimination of sporadic interfering signals.

Figure 7:
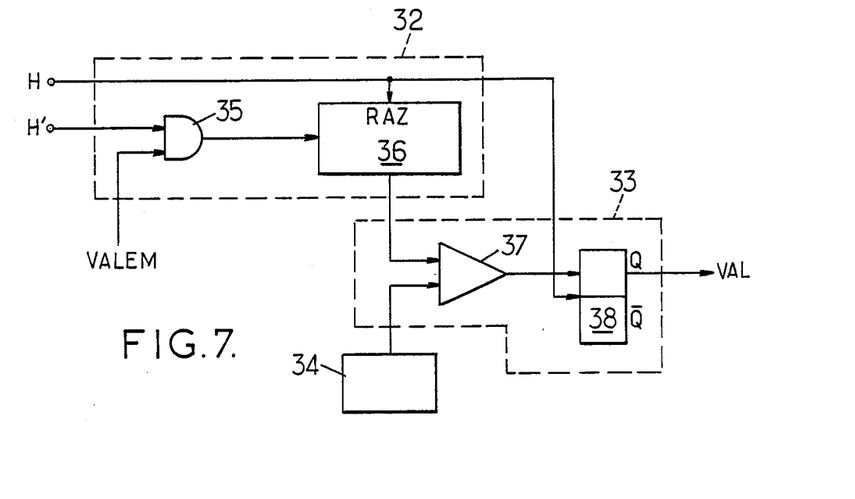
FIG. 7 is an electrical diagram of an embodiment of another portion of the station of FIG. 2.

FIG. 7 shows the electronic diagram of an embodiment of the validation circuit. The detection circuit 32 of the emission density of the signal comprises an AND gate 35 whose input is connected to a clock H' (not shown) delivering a signal of period T/N, T being the recurrence period of the measurements and 1/N being the desired resolution for these measurements; the other input of the AND gate 35 receives a logic signal VALEM which equals 1 when there is an emission of radiation and 0 in the contrary case. The output of the AND gate 35 is connected to an input of a counter 36 whose zero reset input (RAZ) is connected to a clock H providing a signal period Y.

When there is an emission of radiation (signal VALEM=1) the AND circuit 35 allows the clock signal H' of period T/N to pass, of which the pulses are counted by the counter 36. At the expiration of each period of time T, the counter 36 provides an output signal comprised between O and N representing the density of emission measured over the period T.

The output of the counter 36 is connected to the input of the validation circuit 33, in other words to the input of a comparator 37 of which the other input is connected to a threshold-programming circuit 34. The output of the comparator 37 is connected to the input of a flip-flop 38 of type D whose clock input receives the clock signal H of period T.

The result of the comparison appearing at the output of the comparator 37 is hence memorized every T seconds by the flip-flop 38 and the signal VAL appearing at the non-reversing output Q of the latter indicates at any moment if the measurement of the density of emission effected during the preceding period was greater (VAL=1) than the threshold set or less than this threshold (VAL=0).

In addition, this value of the emission density can be preserved as a characterizing element as indicated below.

From the data thus validated, there then follows calculation of the angular direction in azimuth and/or in elevation of the source of radiation with respect to the station, taking into account possible necessary corrections (standardizing, coupling between antennae, environmental effects, etc.).

Storage then follows, in a memory 39, of numerical data constituted each by the whole of an information resulting from the previously effected calculation, of information relating to the data of the emission (obtained from a synchronous clock 40 synchronized with those of the other stations), and possibly of characterizing information which, as indicated above, may be the value of the emission density, or the same supplied by a detector enabling the discharge to be characterized.

The numerical data thus constituted are then transmitted (transmission circuit 41) in any suitable manner, for example via a suitable speed modulator 42 and a normal or special telephone line 43, to the central data acquisition unit 4.

The storage of the data at 39 enables the supply of data to be transmitted to the transmission means to be spread over time: the latter therefore does not have to have a transmission capacity which is too great and the cost is therefore all the less.

Figure 8:
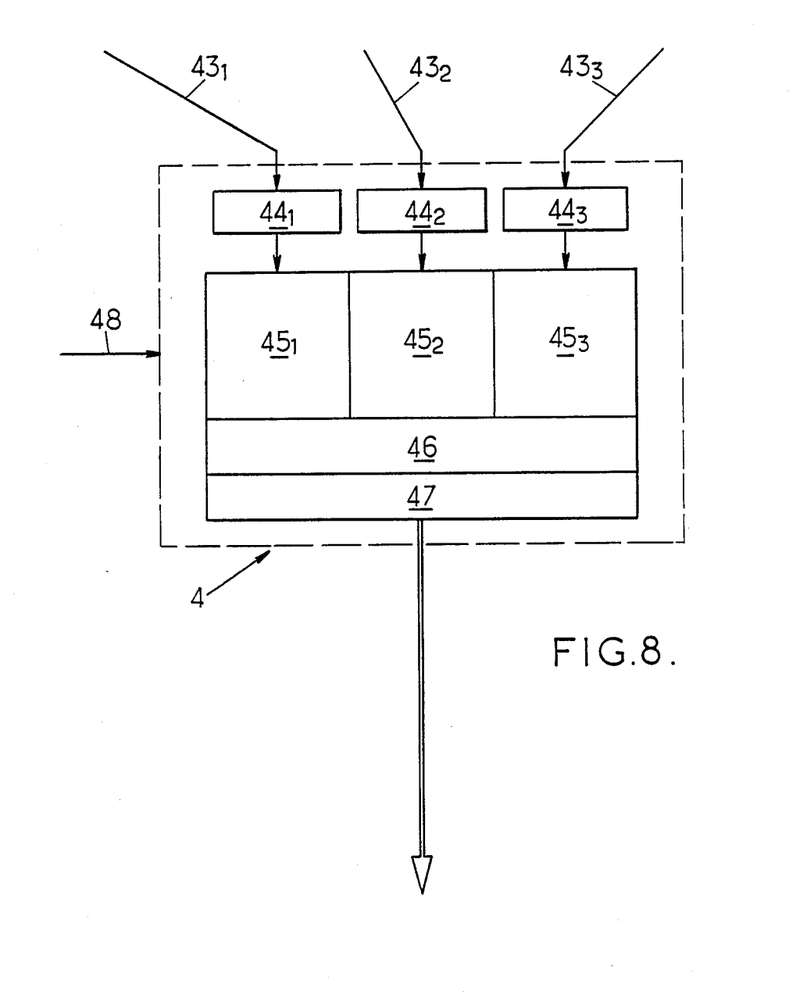
FIG. 8 is a functional block diagram of a data acquisition unit forming part of the installation of FIG. 1.

The central data acquisition unit 4, shown in FIG. 8, receives simultaneously, through, for example, respective telephone lines $43_1$, $43_2$ and $43_3$ and respective demodulators $44_1$, $44_2$ and $44_3$, the numerical data coming from the measuring stations 1, 2 and 3, which data are applied to acquisition circuits $45_1$, $45_2$ and $45_3$ respectively.

A sorting unit 46 performs a temporal sorting of the data thus received and only preserves the numerical data of the same date common to at least two stations and these data are rearranged, then stored in a memory at 47 before being supplied to the real time data processing unit 5. The presence of the memorization means 47 hence permits, here again, the transmission of the data to the processing unit 5 to be spread over time and hence this transmission to be adapted to the computing capacity of this unit 5, which can hence be of smaller dimensions and hence be less expensive.

Of course, the handling of the data acquisition unit 4 is synchronized to the same rate as the processing units of the angular locating stations (connection 48).

Figure 9:
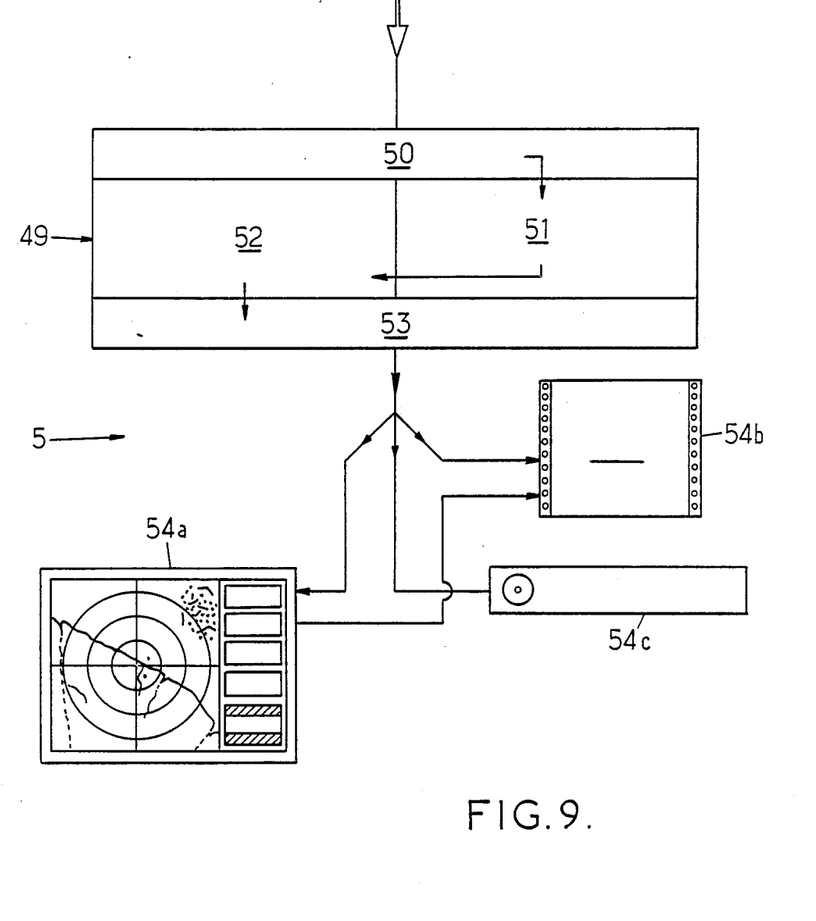
FIG. 9 is a functional block diagram of a processing unit for data in real time forming part of the installation of FIG. 1.

The real time data processing unit 5, shown in FIG. 9, comprises a calculating unit 49 which receives and reads (at 50) the data coming from the acquisition unit 40, takes into account the various standardization data which are communicated to it (at 51) and performs (at 52) the calculation proper of the location of the source of radiation (lightening strike). The central calculator selects the two stations, among the three, which permit the best location (the criterion taken being that the source to be localized occurs outside of the axis of the two stations adopted), the data coming from the third serving then as a checking means. The results of the calculation are finally shaped (at 53) in suitable manner, then directed to the display means (for example display in real time on a screen 54a, printing of the data in real time at 54b, storage of the data in real time in 54c, etc.).

Of course, to the real time data processing means considered above, it is possible to add off-line time data processing means, statistical processing means, or the like (not shown).

It is hence necessary to ensure the synchronization of the stations in order to reset in time the time acquisition windows at the various stations. This time synchronization can be used in the two following ways:

1—to compensate, if necessary, the time differences of propagation between stations in the case of very distant stations, hence to facilitate and accelerate the placing in temporal coincidence of the data at the level of the central system;

2—to improve the accuracy of location by combining the angular locations of the various stations with the measurements of the difference in arrival times between stations. In fact, the measurement of difference of arrival time of the lightening signals between two stations enables the average direction of the source to be defined (with an accuracy which is a function of the temporal resolution of the measurement); this therefore limits the angular field of search for each station and then permits the use of an ambiguous antennae system but having a better angular resolution; the removal of ambiguity is then done at the level of the central system by combination of the angular location and of the measurements of the arrival time difference.

To this end, each measurement station is equipped with a clock driven by a quartz oscillator designed to date the events arriving at each of the stations. With each measurement made in a station is then associated a date which will be used in the analysis to determine the groups of synchronous measurements. The stability of the oscillators used not being sufficient, it is necessary to synchronize them periodically (for example once per second) by resetting to zero of the associated clock counters (40 in FIG. 2).

The zero reset "pulses" are sent simultaneously to each station from an emitter box situated at the level of the central unit and a receiving box provided in each station ensures thereof the shaping and creates a delay designed to compensate the differential delays introduced by the different lengths of line between the central unit and the respective stations.

Figure 10:
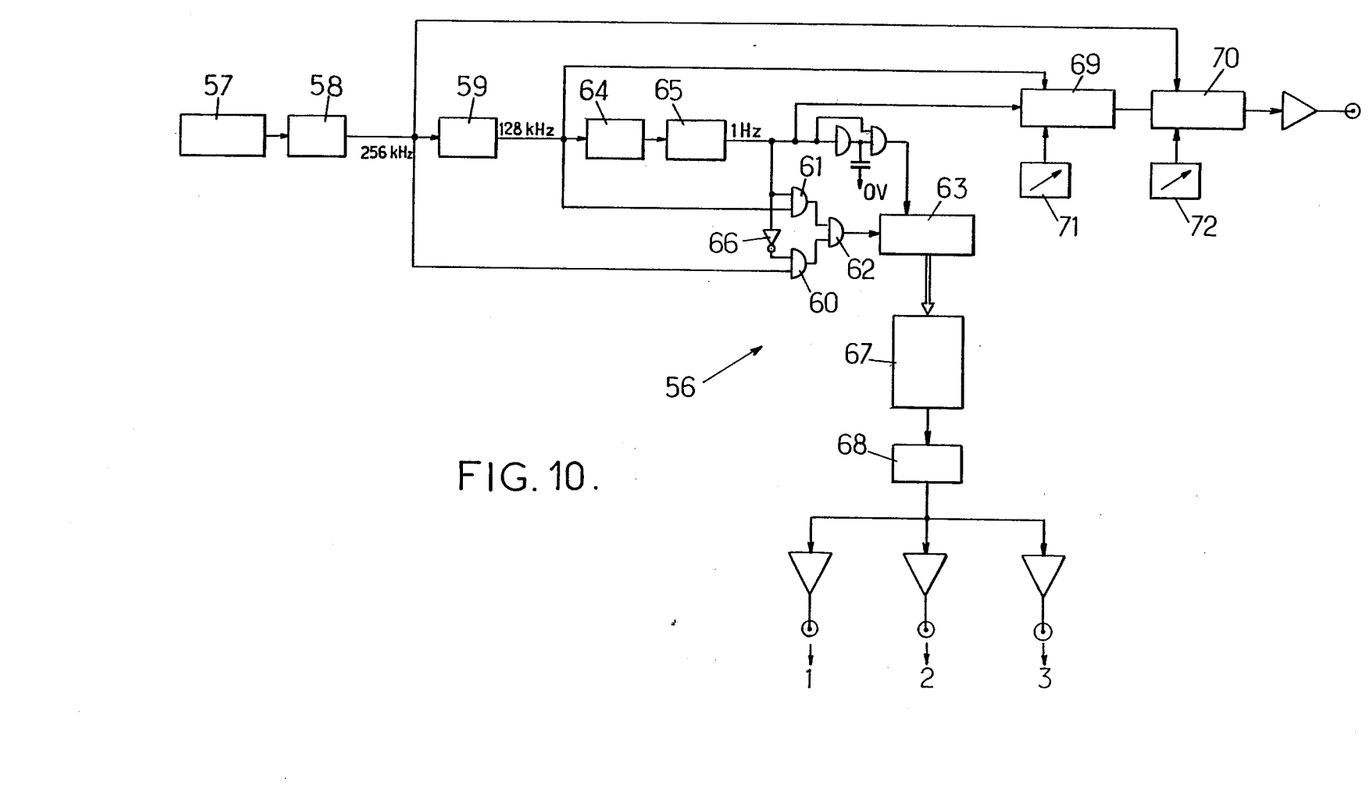
FIGS. 10 to 12 are electronic diagrams illustrating embodiments adapted to ensure certain functions in the installation of the invention.
Figure 11:
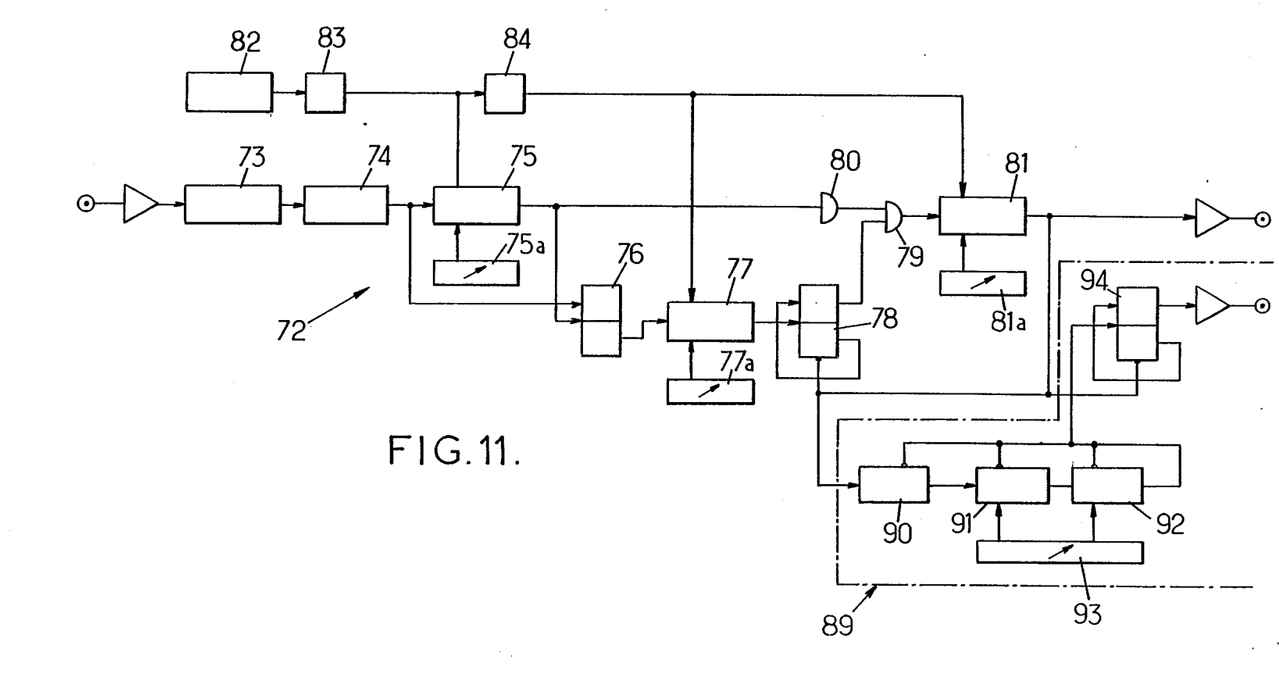
Figure 12:
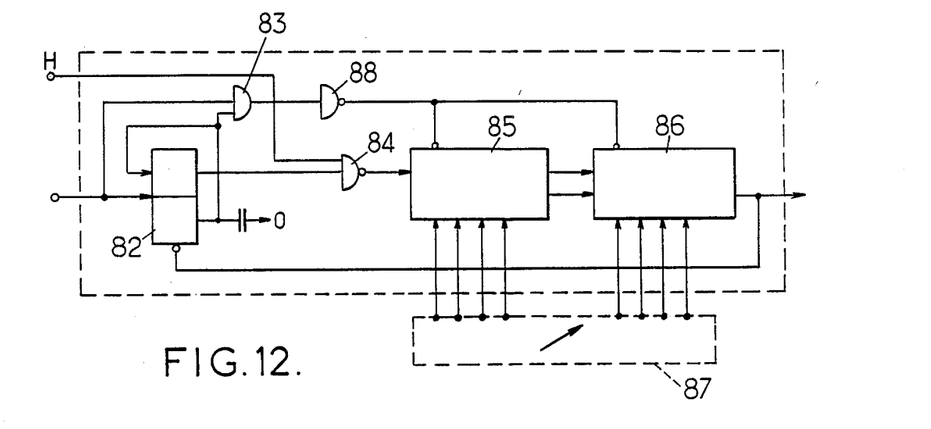

Referring to FIGS. 10 to 12, the constitution and operation of such emitter and receiver boxes for synchronization signals will now be described. The synchronization signals are sent over specialized lines (two wires) connecting each of the stations to the central unit.

The synchronization signals emitted are square signals of frequency 1 Hz, of cyclic ratio 1 and frequency modulated (the level 0 is modulated by a frequency $f_1$—for example 1000 Hz—and the level 1 is modulated by a frequency $f_2$—for example 2000 Hz—

Referring first to FIG. 10, the emitter box 56 comprises a quartz oscillator 57 (for example at the frequency of 1.024 MHz) followed by a divider circuit by four 58 providing a first signal at the frequency of 256 kHz and itself followed by a divider circuit by two 59 providing a second signal at the frequency of 128 kHz. The outputs of these two divider circuits are connected respectively to an input of two AND gates 60, 61 whose outputs are connected to two inputs of a third AND gate 62 having its output connected to the input of a divider circuit by 128, 63.

In addition, the output of the divider circuit by two 59 is connected to a divider circuit by 128, 64, itself followed by a divider circuit by 1000, 60, of which the output, supplying a triggering signal at the frequency of 1 Hz and of cyclic ratio 1, is connected on the one hand to the other input of the AND gate 61 and, after inversion (inverter circuit 66), to the other input of the AND gate 60 and, on the other hand, after shaping, to the input of the zero reset of the divider circuit by 128, 63. The three AND gates 60, 61 and 62 constitute a triggered inverter circuit providing the divider circuit by 128, 63, with a signal whose frequency is alternately 256 kHZ and 128 kHz for 500 ms.

The 128 divider, 63 is wired at the 7 bit binary counter and at the output, an address bus is connected to the address input of an EPROM memory 67 with 128 elements whose output is connected to a digital/analog converter 68 connected at the output to three transmission lines to respectively the three measuring stations 1, 2 and 3.

In addition, an adjustable synchronizing circuit comprises a first monostable flip-flop 69 of which the input receives the output signal at frequency 1 Hz, from the divider by 1000, 65, whilst its triggering input is connected to the output of the divider by 2, 59, and receives the signal of frequency 128 kHz. The output of this first monostable flip-flop is connected to the input of a second monostable flip-flop 70 of which the triggering input is connected to the output of the divider by 4, 58, and receives the signal of frequency 256 kHz. To each monostable flip-flop 69, 70 is connected a circuit, respectively 71, 72, enabling the regulation of the duration of the output pulse, so that the output signal is, after amplification, a 1 Hz frequency synchronization signal sent with an adjustable delay to the central unit to synchronize the operation of the latter with the three measuring stations.

FIG. 11 shows the diagram of a receiving box 72 for synchronization signals, which equips each of the stations 1, 2 and 3. The synchronizing pulses received are, after amplification, sent to a band pass filter 73, then shaped at 74, before being applied to the input of a monostable flip-flop 75 adjustable by a regulating circuit 75a and, simultaneously, to an input of a flip-flop 76 of type D whose clock input receives the output signal from the monostable flip-flop 75. The inverting output of the flip-flop 76 of type D is connected to the input of another monostable flip-flop 77 adjustable by a regulating circuit 77a. The output of the flip-flop 77 is applied to the clock input of another flip-flop 78 of type D whose inverting output is looped to the input D and whose non-inverting output is connected to an input of an AND gate 79 of which the other input receives the output signal from the monostable flip-flop 75 inverted by an AND gate 80. The output of the AND gate 79 is connected to the input of yet another monostable flip-flop 81, adjustable through a regulating circuit 81a, of which the output, after amplification, supplies the synchronizing pulses necessary for the operation of the measuring station.

The output of the monostable flip-flop 81 is connected to the zero reset input of the type D flip-flop 78.

A quartz clock 82 supplies a signal at the frequency of 1 MHz which, after division by two by a divider circuit 83 (500 kHz), is, on the one hand, applied to the clock input of the monostable flip-flop 75 and, on the other hand, after further division by five by the divider circuit 84 (100 kHz), is applied to the respective clock inputs of the monostable flip-flop 77 and 81.

The circuit formed by the monostable flip-flop 75 and the type D flip-flop 76 detects the moment of change in frequency in the synchronization signal received. The circuit formed by the monostable flip-flop 77 and the type D flip-flop 78 enables a subsequent pulse to be selected (for example the fifth after this change in frequency), the first pulses immediately following the change in frequency being affected by "jitter" and not being usable to serve as a reference. The pulse so-selected triggers the monostable flip-flop 81 which can be programmed so as to permit a compensation of the differential delay introduced by the different transmission times between the emission box and the respective receiving boxes of the various measuring stations. In order to ensure good stability and good reproducibility of the delays between the various measuring stations, it is desirable for the monostable flip-flops used to be numerical monostable flip-flops, whose diagram is given in FIG. 12.

Each numerical monostable flip-flop comprises a type D flip-flop 82 whose clock input constitutes the input of the numerical monostable flip-flop, which input is also joined to an input of an AND gate 83 preventing the retriggering of the monostable flip-flop. The inverting output of the flip-flop 82 is looped to its input and connected also to the other input of the AND gate 83, whilst its non-inverting output is connected to an input of a NOT AND gate 84 whose other input is connected to the clock input H of the numerical monostable flip-flop. The output of the NOT AND gate 84 is connected to the input of a counting circuit, constituted by two prepositionable decimal counter-decounters 85 and 86 (for example that available under the reference Texas Instruments 74 192) connected in series with a prepositioning circuit 87, permitting setting up of the desired delay, acting on the bits of weights 1, 2, 4, 8, 16, 32, 64 and 128. The output of the counter, constituting the output of the numerical monostable flip-flop, is connected to the input of the zero reset of the type D flip-flop 82. In addition, the output of the AND gate 83 is connected, through an inverting gate 88, to the clock inputs of the counters 85 and 86.

In the monostable flip-flop which has just been described, the counter performs a counting between 1 and 255. If T is the period of the clock signal H, the delay which it will be possible to introduce on the input signal could be comprised between 1T and 255T with an error less than or equal to T.

Finally, it is advantageous to provide standardizing means for each measuring station, in order to be able to proceed with the adjustment of the latter in the absence of lightening strikes and also to be able to determine the phase shift itself introduced by each measuring station and to take it into account in the calculations of location of the electromagnetic source.

One example of such a standardizing control circuit is shown at 89 in FIG. 11. It comprises a divider circuit by sixty 90 of which the input is connected to the output of the monostable flip-flop 81 and whose output is connected to a programmable divider circuit, constituted for example by two counter decounters 91, 92 actuated by a prepositioning circuit 93; the output of this programmable divider circuit is connected, on the one hand, to clock inputs of the counter-decounters 91, 92 and to the zero reset input of the divider 90 and, on the other hand, to the clock input of a type D flip-flop 94 whose inverter output is looped to the input and whose zero reset input is connected to the output of the monostable flip-flop 81. The output of the flip-flop 94 constitutes, after adaptation, the standardizing control output of the station, connected to an emitter $e_1$, $e_2$ and $e_3$ placed in the antenna by $I_1$, $I_2$ and $I_3$ respectively of the stations 1, 2 and 3 (FIG. 1). There is thus triggered every p minutes, a standardizing sequence 1 second in duration, the number p being programmable manually (at 93) from 0 to 255 minutes.

The installation which has just been described with reference to FIGS. 1 to 12 enables the detection at a distance of any notable electrical activity capable of moving towards a site, to be ensured; this activity is connected either with convective fronts, or isolated cells in motion; this first function is essentially a function of surveillance and of medium term forecasting, for example of the order of an hour or several hours, the nominal distance of detection of the active zone being, for example, of the order of 150 km.

The electrical activity existing is detected by the electromagnetic radiation created by the lightening strikes which can be established at greater or lesser time intervals (from some seconds to some minutes).

The associated equipment must be capable of providing one location point per flash detected (possibly several if the flash is sufficiently powerful and widespread);

the point will be defined by its distance to the meteorological center and by its bearing. The distance of detection, will, for example of the order of 150 km, hence homogeneous with observational distances by radar.

The data will be processed in two ways:

the determination of the number n of points per unit time will enable the extent of the electrical activity observed to be assessed;

the development of the distribution of the location points as a function of time will give information on the risks that the storm system is moving towards the vicinity of the site concerned.

These data will enable the control center to inform the responsible operational personnel of the site to provide protection for:

the pursuit or interuption of operations judged dangerous (handling of rocket fuels, pyrotechnic devices, etc.);

the launching or not of operations taking place over fairly long periods (several hours);

evaluating the risk of lightening strike of an aircraft in flight (direct lightening flashes or in the vicinity) even if the electrical activity above the site is not particularly marked.

It is to be noted that this information, processed over fairly long periods of time, will be of a nature to provide better knowledge of phenomena of the atmospheric type existing in the environment of the site and will permit, by comparison with data of the same nature obtained at other sites, to characterize better the conditions of operation of the site concerned with respect to its meteorological environment.

As is self-evident and as emerges besides already from the foregoing, the invention is in no way limited to those of its types of application and embodiments which have been more especially envisaged; it encompasses on the contrary, all modifications.

We claim:

1. Installation for the spacial location by interferometric measurement, in real time and at a great distance, of the electrical component of electromagnetic radiation generated by lightning discharges, said installation comprising, in combination:

(i) at least two and at most three interferometric location stations for determining the angular location of a said lightning discharge and situated at a moderate distance from one another, each station comprising:

at least two fixed receiving antennas for receiving at least one electromagnetic radiation of predetermined wavelength in the UHF-VHF waveband generated by such lightning discharges, interferometric processing means for measuring, the phase differences between signals produced by the antennas in response to the electromagnetic radiation received thereby and for processing the results of measuring said phase differences to provide information representative of the elevation and azimuth of said electromagnetic radiation, threshold validation means, sensitive to the magnitude of at least one parameter of the electromagnetic radiation received, for producing an actuating signal when said magnitude is greater than a preestablished threshold, data storing means, responsive to said threshold validation means, for selecting the information provided by the interferometric processing means only when said magnitude is greater than said preestablished threshold, means for producing numerical data based on said information as selected by the sorting means, and on information representing the date of the lightning discharge, processing means for processing said numerical data such that said numerical data is temporarily stored at each station and then transmitted periodically in blocks and at a frequency which is consistent with the discharge activity, storage means for temporarily storing the numerical data for a time period which is a function of the possible transmission flow rate, transmission means, in a transmission line, for transmitting the numerical data;

(ii) transmission lines for respectively connecting the location stations to an acquisition center for numerical data, said acquisition center comprising:

respective receiving means for receiving the numerical data transmitted from the location stations, means for sorting and associating the information having, in a predetermined time span, the same date and transmitted respectively from different location stations, and storage means, connected to said sorting and associating means, for temporarily storing the sorted and associated information for a time period which is a function of the calculating capacity of the acquisition center, (iii) calculating means for determining, by triangulation, from the sorted and associated data relating to elevation and azimuth, the spacial position of the lightning discharge which occurred on said date; and (iv) display means for displaying the results provided by said calculating means.

2. Installation according to claim 1, comprising at least three angular location stations which are not mutually aligned, said installation comprising, in addition, means for determining the two stations adapted to provide, at a given date, the spacial position with the best precision, and wherein the sorting and association means for the acquisition center is arranged to select paris of data of the same date collected by the two stations providing the greatest precision at this date.

3. Installation according to claim 1, wherein the electromagnetic radiation detected possesses a frequency of about 140 MHz.

4. Installation according to claim 1, wherein the location stations possess respectively time bases synchronized from a common synchronization source and means for taking into account respective delays undergone by the synchronization signals in the respective transmission lines.

5. Installation according to claim 4, wherein:

the common synchronization source comprises snychronization signal generating means for generating a synchronization signal which is of substantially square wave form, has a frequency of about 1 Hz, is of cyclic ratio substantially equal to 1 and is frequency modulated, and a memory means which contains values corresponding to an elementary period of modulation frequency and which is addressed by a clock signal constituted by said synchronization signal, connecting means are provided between said common synchronization source and the respective time bases of the location stations to transmit to said time bases the output signals from the memory means, and each time base of a location station comprises:

filtering and shaping means for filtering and shaping the signal received, means for determining the moment of frequency change of said received signal, selecting means for selecting in said signal a stable synchronization signal, delay means, coupled with above-mentioned means, for taking into account the delay introduced by the duration of the transmission in said connection means with respect to the duration of transmission in the connection means with the other location stations, and output means for outputting a stable and compensated time base synchronization signal.

6. Installation according to claim 1, wherein said threshold validation means are sensitive to the emission density of said electromagnetic radiation and comprise:

counting means for performing counting during a predetermined period T measured from the beginning of the operation thereof, detection means for the detection, at the receiving antennas, of electromagnetic radiation to be detected, triggering means, actuated by said detection means, for triggering the starting of said counting means, comparator means for comparing the output signal from the counting means at the end of a time T with a predetermined threshold, and memorizing means for storing the result of the comparison by said comparator means as a first voltage level if the count is less then the predetermined threshold and as a second voltage level if the count is higher than said threshold.

7. Installation according to claim 1, wherein each location station comprises three simple antennas omnidirectional in azimuth, these antennas being arranged in a triangle and being selected from among the types monopole $\lambda/4$ on a plane, monopole $5\lambda/8$ on a plane or dipole $\lambda/2$ wherein $\lambda$ is the wavelength of the electromagnetic radiation to be detected.

8. Installation according to claim 7, wherein the antennas have a directivity in elevation which is not greater than 3 dB.

9. Installation according to claim 1, wherein each location station comprises antennas directional in azimuth which are arranged for detection in a limited angular field or arranged for detection isotropic in azimuth by combination of several antennas pointed in complementary directions.

10. Installation according to claim 1, wherein the antennas of each station are mutually separated by about one-half wavelength of the radiation to be detected.

11. Installation according to claim 1, comprising in addition at the acquisition center of the numerical data, means for determining the differences in arrival time between different location stations and wherein the calculating means are arranged to use these data of differences in arrival time conjointly with the other said sorted and associated data, so that it is possible to perform the location of the electromagnetic radiation source constituted by the lightening discharge from an ambiguous antenna system, but conferring better angular resolution.

12. Installation according to claim 1, comprising in addition standardization actuating means, including an emitter for transmitting electromagnetic radiation of the frequency to be detected and detection and calculating means for the phase difference itself of the installation, by means of which it is possible to correct the measurement thereof.

* * * * *